United States Patent [19]
Braida et al.

[11] Patent Number: 5,745,873
[45] Date of Patent: Apr. 28, 1998

[54] SPEECH RECOGNITION USING FINAL DECISION BASED ON TENTATIVE DECISIONS

[75] Inventors: Louis D. Braida, Arlington; Paul Duchnowski, Brookline, both of Mass.

[73] Assignee: Massachusetts Institute of Technology, Cambridge, Mass.

[21] Appl. No.: 821,509

[22] Filed: Mar. 21, 1997

Related U.S. Application Data

[63] Continuation of Ser. No. 400,677, Mar. 8, 1995, abandoned, which is a continuation of Ser. No. 877,465, May 1, 1992, abandoned.

[51] Int. Cl.$^6$ .................................................. G10L 5/00
[52] U.S. Cl. .................... 704/222; 704/200; 704/243; 704/247; 704/256; 704/231
[58] Field of Search .......................... 395/2.09, 2.31, 395/2.4, 2.52, 2.56, 2.65

[56] References Cited

U.S. PATENT DOCUMENTS

| | | | |
|---|---|---|---|
| 4,227,177 | 10/1980 | Moshier | 179/15 A |
| 4,348,553 | 9/1982 | Baker et al. | 179/15 B |
| 4,432,096 | 2/1984 | Bunge | 395/2.15 |
| 4,509,186 | 4/1985 | Omura et al. | 381/43 |
| 4,587,670 | 5/1986 | Levinson et al. | 381/43 |
| 4,805,218 | 2/1989 | Bamberg et al. | 381/43 |
| 4,805,219 | 2/1989 | Baker et al. | 381/43 |
| 4,817,159 | 3/1989 | Hoshimi et al. | 395/2.63 |
| 4,905,285 | 2/1990 | Allen et al. | 381/41 |
| 4,914,703 | 4/1990 | Gillick | 381/43 |
| 4,937,871 | 6/1990 | Hattori | 381/43 |
| 4,956,865 | 9/1990 | Lennig et al. | 381/43 |
| 4,963,030 | 10/1990 | Makur | 395/2.31 |
| 5,050,215 | 9/1991 | Nishimura | 395/2.65 |
| 5,210,820 | 5/1993 | Kenyon | 395/2.09 |
| 5,268,990 | 12/1993 | Cohen et al. | 395/2 |
| 5,299,284 | 3/1994 | Roy | 395/22 |

OTHER PUBLICATIONS

Paul, The Lincoln Laboratory Journal, vol. 3, 1990, pp. 41–61, "Speech Recognition Using Markov Models".

Milner et al., ASHA Reports, pp. 30–44, 1984, No. 14, "Perception of Filtered Speech by Hearing-Impaired Listeners".

Davis, et al., IEEE Transactions on Acoustics, Speech, and Signal Processing, AASP-28:pp.357–366, Aug. 1980, "Comparison of Parametric Representations For Monosyllabic Word Recognition in Continuously Spoken Sentences".

Lee et al., IEE Transactions on Acoustics, Speech, and Signal Processing, 37:pp. 1641–1648, 1989, "Speaker-Independent Phone Recognition Using Hidden Markov Models".

Gupta et al., IEEE, pp. 697–700, 1987, "Integration of Acoustic Information in a Large Vocabulary Word Recognizer".

Vilaclara, Signal Processing III: Theories and Applications, 407–410, 1986, "Recognition of Labial-Doubles for a Substitution Hearing Aid".

Schwartz et al., IEEE 1205–1208, 1985, "Context-Dependent Modeling for Acoustic-Phonetic Recognition of Continuous Speech".

(List continued on next page.)

*Primary Examiner*—Allen R. MacDonald
*Assistant Examiner*—Alphonso A. Collins
*Attorney, Agent, or Firm*—Fish & Richardson P.C.

[57] ABSTRACT

A method for recognizing speech elements (e.g., phones) in utterances includes the following steps. Based on acoustic frequency, at least two different acoustic representatives are isolated for each of the utterances. From each acoustic representative, tentative decision information on the speech element in the corresponding utterance is derived. A final decision on the speech element in the utterance is then generated, based on the tentative decision information derived from more than one of the acoustic representatives.

31 Claims, 8 Drawing Sheets

OTHER PUBLICATIONS

Dautrich et al, IEEE Transactions on Acoustics, Speech, and Signal Processing, AASP-31:793-806, 1983, "On The Effects of Varying Filter Bank Parameters on Isolated Word Recognition".

Lee et al., Speech Communication 9:497-508, 1990, "Speech Recognition Using Hidden Markov Models: a CMU Perspective".

Rabiner, Proceedings of the IEEE 77:257-285, Feb. 1989, "A Tutorial on Hidden Markov Models and Selected Applications in Speech Recognition".

Braida, The Experimental Psychology Society 43A (3) 647-677, 1991 "Crossmodel Intergration in the Identification of Consonant Segments".

G.M. White and R.B. Neely, "Speech recognition experiments with linear prediction, bandpass filtering, and dynamic programming", IEEE Trans. Acoust. Speech Signal Processing, vol. ASSP-24, pp. 183-188, 1976.

H. Secker-Walker and C. Searle, "Time-domain analysis of auditory-nerve-fiber firing rates", J. Acoust. Soc. Amer., 88, pp. 1427-1436, 1990.

Y. Linde, A. Buzo, and R.M. Gray, "An algorithm for vector quantizer design", IEEE Transactions on Communications, COM-28(1), pp. 84-95, 1980.

L.F. Lamel, R.H. Kassel and S. Seneff, "Speech database development: Design and analysis of the acoustic-phonetic corpus", Proc. Darpa Speech Recogn. Workshop, L.S. Bauman, Ed., pp. 100-109, 1986.

L.E. Baum, "An inequality and associated maximization technique in statistical estimation of probabilistic functions of Markov processes", Inequalities, 3, pp. 1-8, 1972.

J.K. Baker, "The Dragon System—An overview", IEEE Trans. Acoust., Speech, Signal Processing, vol. ASSP-23, pp. 24-29, 1975.

J.R. Bellegarda and D. Nahamoo, "Tied Mixture Continuous Parameter Modeling for Speech Recognition", IEEE Trans. Acoust., Speech, Signal Processing, 38(12), Dec. 1990, pp. 2033-2045.

R.M. Gray, "Vector Quantization", Readings in Speech Recognition, Ed. by A. Waibel & K.F. Lee, Morgan Kaufman Publishers, Inc., 1990, pp. 75-100.

J.K. Baker, "Stochastic Modeling for Automatic Speech Understanding", Readings in Speech Recognition, Ed. by A. Waibel & K.F. Lee, Morgan Kaufman Publishers, Inc., 1990, pp. 297-319.

X.D. Huang et al., "Semi-Continuous Hidden Markov Models for Speech Signals", Readings in Speech Recognition, Ed. by A. Waibel & K.F. Lee, Morgan Kaufman Publishers, Inc., 1990, pp. 340-365.

K.F. Lee et al., "An Overview of the Spinx Speech Recognition System", Readings in Speech Recognition, Ed. by A. Waibel & K.F. Lee, Morgan Publishers, Inc., 1990, pp. 600-610.

Bellegarda et al., "Automatic Recognition of Integrated Speech and Handwriting Information", IBM Research, T.J. Watson Research Center, Yorktown Heights, NY, Oct. 21, 1991, pp. 1-22.

Fletcher, "Methods of Measuring The Recognition Aspect of Speech", *Speech and Hearing in Communication*, Chapter 15, 1953, pp. 278-317.

Allen, "How Do Humans Process and Recognize Speech?", IEEE Transactions on Speech and Audio Processing, vol. 2, No. 4, Oct. 1994, 567-577.

Research Triangle Institute, Autocuer Product Description Manuscript.

Miller et al., "An Analysis of Perceptual Confusions Among Some English Consonants", The Journal of the Acoustical Society of America, 27(2):338-352 (1955).

O'Shaughnessy, "Redundancy in Speech" Speech Communication Human and Machine, Addison-Wesley Publishing Company, Copyright 1987.

Stevens et al., "Toward a Phonetic and Phonological Theory of Redundant Features", Invariance and Variability in Speech Processes, Erlbaum Assoc. (1987).

Gupta et al., "Integration of Acoustic Information in a Large Vocabulary Word Recognizer", 1987, IEEE.

Bourlard et al., "Towards Increasing Speech Recognition Error Rates", May 1996, Speech Communication, vol. 18, No. 3.

SPEECH RECOGNITION USING FINAL DECISION BASED ON TENTATIVE DECISIONS

This is a continuation of application Ser. No. 08/400,677 filed on Mar. 8, 1995, now abandoned which is a continuation of 07/877,465, filed on May 1, 1992, now abandoned.

This invention was made in the course of work supported by the U.S. Government, which has certain rights in the invention.

BACKGROUND OF THE INVENTION

This invention relates to automatic speech recognition (ASR).

One key goal of automatic speech recognition is to enable a machine to "understand" normal human speech of an arbitrarily chosen speaker. This would permit, for example, extremely easy, intuitive control of a computer. Several factors make automatic speech recognition difficult. One is speech differences among speakers. Another is speech non-conformities caused when sounds are improperly deleted, inserted, or mispronounced in spoken words. The recognition process may also be hampered by background noises.

Recognition is even harder when speech is continuous. Words may be run together without pauses or other cues to indicate the end of one word and the beginning of the next. Variations in sentence structure may alter interactions between adjacent words.

Automatic speech recognition typically begins with conversion of the voice (acoustic signal) into an electronic analog signal, e.g., using a microphone. The analog signal is digitized and temporarily stored. Sets of the stored data, each set representing a time segment of the analog signal, may then be processed for the purpose of recognizing elements of spoken words. The processing can include statistical analyses and comparisons with known speech patterns.

It is known to split the digitized data into different frequency bands for analysis. Based on the analyses of the different bands, parameters representing speech characteristics in each frequency band are created. Then, these parameters are integrated and speech elements are recognized.

SUMMARY OF THE INVENTION

The invention takes advantage of redundant cues present in elements of speech at different acoustic frequencies to increase the likelihood of correct recognition. Speech elements are identified by making tentative decisions using frequency-based representations of an utterance, and then by combining the tentative decisions to reach a final decision.

Thus, in general, in one aspect, the invention features recognizing speech elements (e.g., words, phones) in a signal representing utterances. Based on acoustic frequency, at least two different acoustic representations are isolated for each utterance. A tentative decision on the speech element in the corresponding utterance is derived from each acoustic representation. Based on the tentative decisions derived in the processing channels from more than one of the acoustic representations, a final decision on the speech element in the utterance is generated.

Embodiments of the invention may include the following features. Each acoustic representation may be based on a band of acoustic frequencies. The acoustic representations are divided into time-based frames (e.g., each 20 milliseconds long). The different bands of acoustic frequencies may be non-overlapping. There may be at least four acoustic frequency bands. Each tentative decision may be derived by forming a parameter vector for each acoustic representation, quantizing the parameter vector to form a quantized vector, and mapping the quantized vector to the tentative decision. At least one parameter may be represented in the time domain, using, e.g., an autocorrelation function. The mapping may be done by applying a sub-recognizer to match quantized vectors to models of speech elements. The sub-recognizer may issue a tentatively recognized speech element per time-based frame. The final decision may be generated by forming a global observation index based on the tentative decisions derived from the acoustic representations and then mapping a plurality of global observation indexes to a final decision by matching the global observation indexes to models of the speech elements. The speech elements may be phones. The models may be left-to-right hidden Markov models.

In general, in another aspect, the invention features apparatus for performing the recognition of speech elements.

Other advantages and features will become apparent from the following description, and from the claims.

DESCRIPTION

We first briefly describe the drawings.

DETAILED DESCRIPTION

Figure 1:
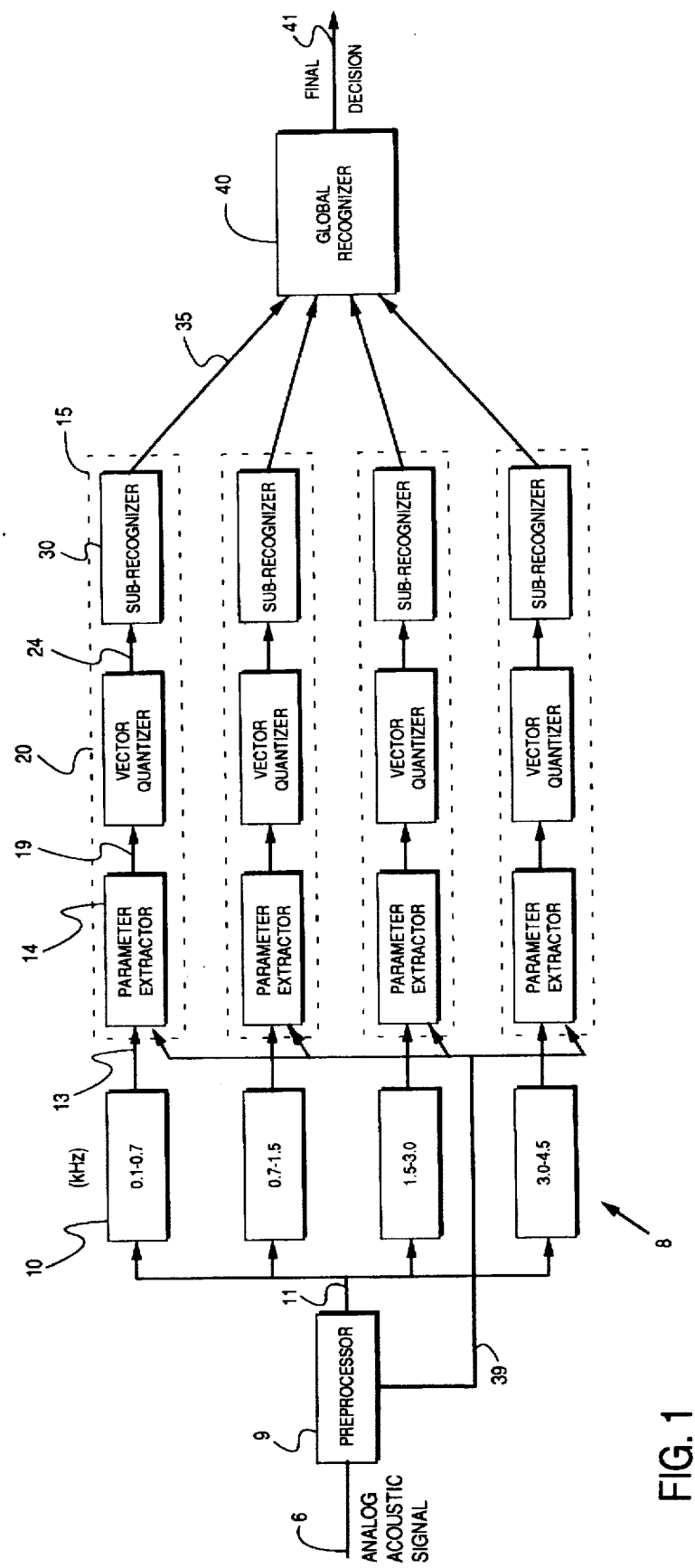
FIG. 1 is a block diagram of a speech recognizer incorporating four processing channels.

Referring to FIG. 1, in general, in an automatic speech recognition system 8, a preprocessor 9 receives electronic, analog continuous speech signals 6 (e.g., from a microphone) and digitizes them at a sampling rate of, e.g., 10 kHz. Preprocessor 9 also computes parameters of the digital samples (e.g., wideband energy). The digitized samples 11 are digitally filtered (in this case by four band-pass filters 10) to generate four different sets of digital data 13 representing four different acoustic frequency bands (0.1 kHz–0.7 kHz, 0.7 kHz–1.5 kHz, 1.5 kHz–3.0 kHz, and 3.0 kHz–4.5 kHz). The set of digital data 13 from each filter is passed to a parameter extractor 14 in a processing channel 15. The parameter extractor divides the signal into successive time-based signal frames 17 (FIG. 2), generates parameter vectors 19, one per frame. Then the parameter vectors are sent to vector quantizer 20 which assigns a codeword 24, i.e., the closest vector of a codebook 22 (FIG. 2) to each parameter vector. There is a codebook for each processing channel. In a recognition mode, quantized vectors 24 are passed to sub-recognizer 30. The output of each sub-recognizer is a tentative decision 35 on a phone corresponding to the portion of speech (i.e., utterance) represented by the signal of the time-based frame. The tentative decisions (four in this case) are fed to a global recognizer 40 which combines them and issues a final decision 41 on the recognized phone.

In a training mode, a training data set is introduced to speech recognition system 8 in order to create phone models which are then used by sub-recognizers 30 in the recognition mode. After the sub-recognizers are trained, a separate set of training data is used to train global recognizer 40.

Figure 2:
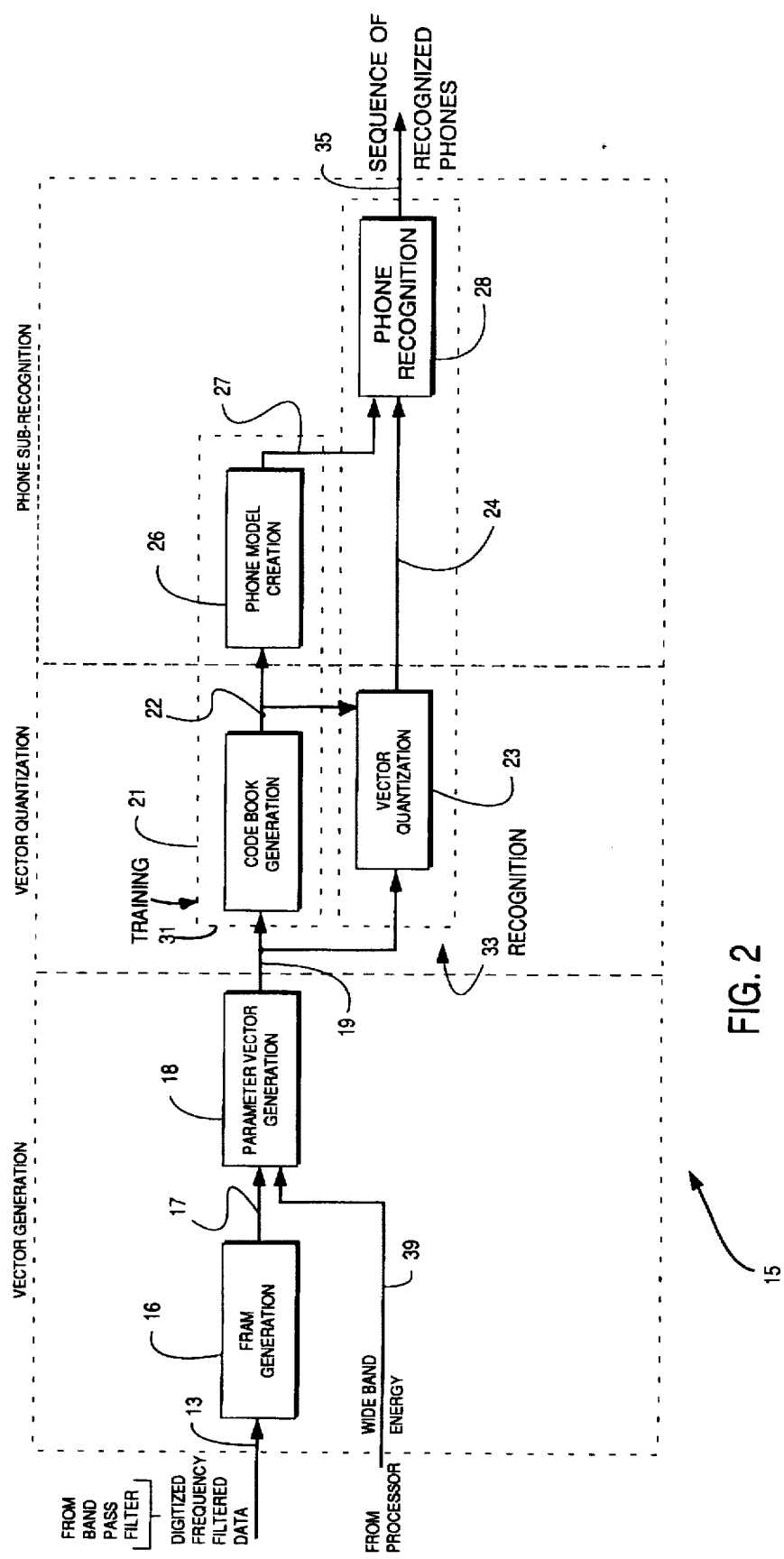
FIG. 2 is a functional block diagram of one processing channel of the speech recognizer.

Referring also to FIG. 2, in each processing channel 15, digital data 13 are divided into Hamming windowed 20 ms long data frames 17. Successive data frames overlap by 10 ms. Next, a parameter vector 19 is generated for each frame (18). The vector has six parameters, also called coordinates, derived from the digitized data of each data frame 17.

The parameter vectors may be used in either of two ways depending on the mode of operation, training 31 or recognition 33.

In training 31, predetermined utterances of a training data set, spoken by a variety of speakers, are used to create a collection of speaker independent phone models 27. The generated unquantized training vectors 19 are processed to generate a codebook (21) of, for example, 128 representative vectors called codewords 22. The set of codewords 22 is then used to generate (26) corresponding phone models 27. A plurality (e.g. 48) of hidden Markov models (HMM) 27 are generated in the training process; each hidden Markov model represents a different phone. The HMMs are used in the recognition mode.

In recognition 33, unquantized vectors are formed on a set of utterances, as previously described. Each vector is then characterized by mapping (vector quantizing) it to the nearest (in Euclidean distance) codeword (23).

The process of vector quantization has been widely explored (a comprehensive review is presented in: "Vector Quantization in Speech Coding", by J. Makhoul and H. Gish, *Proceedings of the IEEE*, 73, pp. 1551–1588, 1985). The quantized vectors 24 are then used in phone recognition (28). Phone recognition (28) is performed in each channel independently using the set of HMMs 27 generated during training. For each data frame, each channel produces a phone estimate. Since, in general, phones have different lengths, the number of data frames corresponding to a recognized phone varies. The four independently recognized phones of each frame are then integrated in global recognizer 40.

Use of banks of bandpass filters for speech recognition has been proposed by G. M. White and R. B. Neely, "Speech recognition experiments with linear prediction, bandpass filtering, and dynamic programming", *IEEE Trans. Acoust., Speech, Signal Processing*, vol. ASSP-24, pp. 183–188, 1976. In general, the number of filters used and their spacing can vary. The filters are usually continuous over the acoustic spectrum. Making the composite spectrum of the overall filter bank essentially flat assures equal weighting across the spectrum. In one scheme, the frequency spectrum is divided uniformly and the filters are spaced uniformly on the frequency scale. Alternatively, the filters may be spaced equally on a logarithmic frequency scale based on a speech information measure such as the articulation index, or using the so-called critical band filter bank (E. Zwicker, "Subdivision of the audible frequency range into critical bands, Frequenzgruppen", *J. Acoust. Soc. Amer.*, 23, p. 248, 1961.) with channels uniform until about 1000 Hz and then logarithmic above 1000 Hz. The filter bank may be implemented as a finite impulse response filter (FIR) which has linear phase properties, or as an infinite impulse response (IIR) filters or combinations of these types of filters.

In vector generation, the parametric representation (the parameter vector components) of the acoustic signal can be either in the time domain or the frequency domain.

When using spectral (frequency domain) measures, parametric representation may be based on the Fourier transform or related transforms, such as the linear frequency cepstrum coefficients and the mel-frequency cepstrum coefficients. Alternatively, the representation may be based on the linear prediction spectrum such as the linear prediction coefficients, the reflection coefficients, or the cepstrum coefficients derived from the linear prediction coefficients (S. B. Davis and P. Mermelstein, "Comparison of Parametric Representations for Monosyllabic Word Recognition in Continuously Spoken Sentences", *IEEE Trans. Acoust., Speech, Signal Processing*, vol. ASSP-28, pp. 357–366, 1980.).

By contrast, parameter extractor 14 (FIG. 1) uses a different approach; it extracts six vector parameters characteristic of the frequency filtered data in the time domain. This yields significant computational savings since the filtered signal has a smaller bandwidth than the whole speech signal. Furthermore, it may lead to a better description of the acoustic data since some prior work on modeling of auditory periphery suggests that speech may be effectively coded on the auditory nerve by using its temporal features (H. Secker-Walker and C. Searle "Time-domain analysis of auditory-nerve-fiber firing rates" *J. Acoust. Soc. Amer.*, 88, pp. 1427–1436, 1990.).

The six vector parameters are: average autocorrelation inter-peak distance, standard deviation of autocorrelation inter-peak distances, average autocorrelation peak ratio, energy share, local rate of change of the energy share, and local rate of change of energy.

The average autocorrelation inter-peak distance parameter is calculated as the average of the first eight inter-peak time distances of the autocorrelation function of a frame.

The standard deviation of autocorrelation inter-peak distances is the standard deviation of the distribution of the above described inter-peak time distances. The average autocorrelation inter-peak distance and its standard deviation were chosen to reflect the principal frequency content.

The average autocorrelation peak ratio is the average of amplitude ratios of each of the first eight peaks to the immediately following peak. The average autocorrelation inter-peak distance reflects the level of damping in the system.

The energy share is computed as the ratio of the total energy in the sub-band frame to the energy in the wideband speech frame. Wideband energy 39 is calculated by preprocessor 9 before the data are digitally filtered. The frame energy is computed as the first point of the frame's autocorrelation function. This parameter is an estimate of the relative energy distribution. The local rate of change of the energy share evaluates the rate of change in the energy share of the sub-band. The local rate of change of energy parameter evaluates the rate of change of energy in the channel.

Figure 3:
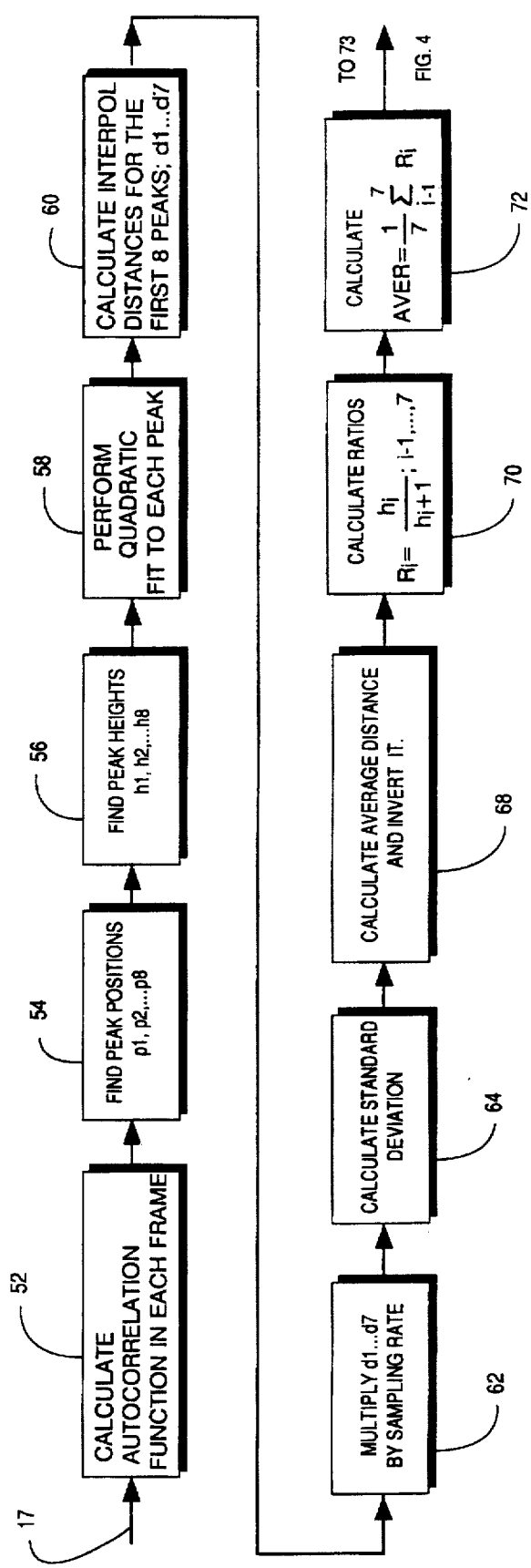
FIGS. 3 and 4 are flow-charts of algorithms for generating vector parameters.
Figure 4:
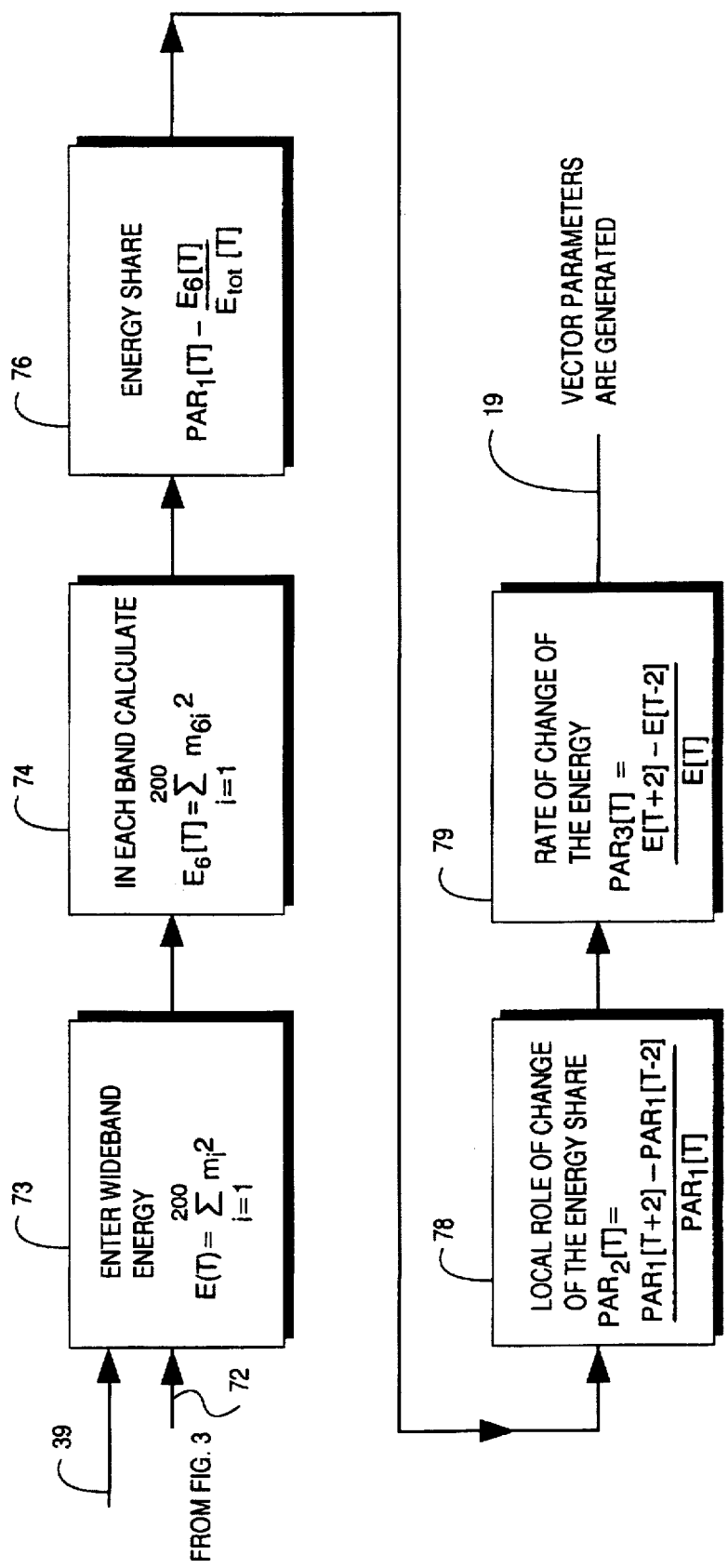

Referring to FIGS. 3 and 4, for each channel, the autocorrelation function is calculated for each data frame (52). Peak positions (54) and peak heights (56) of the autocorrelation function are determined for the first eight peaks. Quadratic fit to each peak is calculated (58) by fitting a quadratic function at the maximum point and two points on either side of the peak. Then, new peak positions and peak heights are re-calculated using the quadratic function (60).

The interpeak distances of the first eight peaks are calculated and multiplied by the sampling period (for example, 100 μs) (62). The standard deviation of the autocorrelation inter-peak distances is calculated using the re-scaled inter-peak distances (64). Next, the average of the re-scaled interpeak distances is calculated; this determines the average autocorrelation inter-peak distance parameter (68). In step 70, the ratios of the amplitudes of neighboring peaks are calculated. The average of the ratios is the average autocorrelation peak ratio parameter (72).

Referring to FIG. 4, the wideband energy per frame T is calculated by preprocessor 9 as the sum of the squares of all points in that frame (73). This calculation is done on the unfiltered data. Similarly, the band-limited energy per frame is calculated (74). Then, the energy share parameter is calculated as the ratio of the band-limited frame energy to the wideband energy (76). The local rate of change of the energy share of the frame T is calculated as the difference between the energy share of frame T+2 and frame T−2, normalized by the energy share of frame T (78). The local rate of change of energy is calculated similarly, except that total frame energies are used in the calculation (79).

During training, codebook generation 21 (FIG. 2) is done using a procedure similar to the one described by Linde, Buzo and Gray (Y. Linde, A. Buzo, and R. M. Gray, "An algorithm for vector quantizer design", *IEEE Transactions on Communications*, COM-28(1), pp. 84–95, 1980). The procedure uses a large number of training vectors currently constructed using 390 sentences taken from the TIMIT database (L. F. Lamel, R. H. Kassel, and S. Seneff, "Speech database development: Design and analysis of the acoustic-phonetic corpus", in *Proc. DARPA Speech Recogn. Workshop*, L. S. Bauman, Ed., pp. 100–109, 1986.) After the training vectors of each processing channel are generated, the system builds the four codebooks.

The process of codebook generation is described under the heading *Generation of the Vector Quantizer Codebook* below. In step 1, sub-recognizer 30 calculates the geometric centroid $c_1$ which is the vector having coordinates which are the averages of all training vector coordinates. The number of centroids K is set to 1 since there is only one centroid, and all vectors are assigned to the first centroid. In step 2, 2K markers are generated by splitting K centroids using a small perturbation $\epsilon$ on the existing K centroids. Then, K is assigned twice its original value. In step 3, for each training vector the closest marker is found by calculating the Euclidian distance of each vector to the markers. Each marker will be assigned a set of the closest vectors; this is the marker's cluster. In step 4, the average distance of each vector to its marker is calculated. In step 5, centroids to each vector cluster are calculated; there are K new centroids. In step 6, average distances of all vectors to their associated centroids are calculated. Step 7 is a convergence check. The average distances of vectors to markers and centroids are compared. If the vectors are on the average closer to their vector centroid than to their marker by some predetermined fraction $\delta$, then step 3 is repeated and the new marker's clusters are created; otherwise the current centroids are assumed converged and step 8 is entered. In step 8 if the number of codewords is less than the desired size of the codebook (for example, 128), the generation of codewords continues starting again in step 2. Otherwise, the generation of the codebook is completed.

Algorithms which rely on other than Euclidian distances may be used. Furthermore, the individual parameters (vector components) could be weighted differently depending on the importance of the information represented by each parameter. The codebook size can be increased to 256 or larger, but doing so increases the computational load and may compromise robustness of models.

During recognition, each of the parameter vectors is quantized by finding the closest codeword using the same measure of distance as used to generate the codebook. The codewords representing the parameter vectors are used in the recognition process.

Recognition is performed in each channel using the set of HMM models created in the training process. There are several available known training procedures, including the forward-backward re-estimation algorithm, gradient hill climbing, and simulated annealing. The present system uses the forward-backward re-estimation algorithm modeled at the phone level. A maximum-likelihood (ML) criterion is used for training since it is computationally inexpensive. The final expectation phase aligns the training data to the model. The maximization phase re-estimates the parameters of the model.

Models used in each of the four sub-recognizers have a hidden Markov model (HMM) structure (described by L. E. Baum in "An inequality and associated maximization technique in statistical estimation of probabilistic functions of Markov processes", *Inequalities*, 3, pp. 1–8, 1972; then extended to automatic speech recognition by J. K. Baker in "The DRAGON System—An overview", *IEEE Trans. Acoust., Speech, Signal Processing*, vol. ASSP-23, pp. 24–29, 1975, and others). The HMM is a collection of states connected by transitions. Each transition carries two sets of probabilities. The first set of probabilities is a state transition probability $a_{ij}$ which describes the likelihood of transition from a state i to a state j. The second is an output probability $b_j(k)$ which defines a conditional probability of emitting an output symbol k from a finite alphabet, given that the transition is taken.

The two probabilities are estimated here using a forward-backward algorithm iteratively. In each iteration cycle, the values of the previous iteration are used to calculate how frequently each symbol is observed for each transition, and how frequently each transition is taken. The new parameters are then normalized by the new counts. The re-estimation of the transition probability and the output probability is effectively used to produce maximum-likelihood estimates (MLE) of the HMM parameters.

HMMs use a maximum a posteriori likelihood classification (recognition) rule which selects the most likely class given the observations. Each HMM state transition will emit (or absorb) an observation according to some probability density function. The state sequence cannot be uniquely determined from the observation sequence and is therefore hidden.

The training procedure used to train each sub-recognizer is similar to the one described by L. R. Rabiner in "Tutorial on Hidden Markov Models and Selected Applications in Speech Recognition", *Proceedings of the IEEE*, Vol. 77, 257, 1989. The phone models are designed to match the observation data as close as possible. The model parameters are adjusted by the training sequence which calculates the optimal model parameters based on the observed training data. Thus, each phone is attributed to a sequence consisting of a number of repetitions of sequences.

The state transition probabilities $a_{ij}$ and the observation symbol probabilities $b_j(k)$ are calculated in the same way as defined by Rabiner. In a left-to-right model used here, a state, once left, cannot be revisited. A transition can only stay in the same state or go to a higher numbered state of the ordered sequences. Due to this specific topology of the left-to-right phone models, shown in the examples of FIGS. 6a, 6b, 7a, and 7b, the transition probability distribution A $\{a_{ij}\}$ ($1 \leq i, j \leq 3$) has zero $a_{21}$, $a_{32}$ and $a_{31}$ terms. Otherwise, there would be a finite probability of revisiting a departed state (e.g., 202 of FIG. 6a) from a subsequent state (e.g., state 204 or 206 of FIG. 6a). Furthermore, since the initial state can be reached only once for each model, the initial state probability $\pi_i=1$ for $i=1$ and zero otherwise, which is more limited than the general case described by Rabiner.

This type of topology, though restrictive, sufficiently approximates speech which is an ordered sequence of sounds. In general, more restrictive topologies can be more robust and require less training data. Moreover, simpler models can yield good performance with substantial computational savings.

In general, the chosen approach gives sufficient flexibility in the assignment of probabilities and is straightforward to use. It suffers, however, from a vector quantizer distortion problem since each parameter vector is represented by a codeword, the nearest vector in the codebook. This forces the system to treat some distinct parameter vectors as if they were identical.

In another embodiment, semi-continuous models could be used, as described in "Tied Mixture Continuous Parameter Modeling for Speech Recognition" by J. R. Bellegarda and D. Nahamoo, *IEEE Transactions on Acoustics, Speech, and Signal Processing*, 38(12), December 1990, pp. 2033–2045. The semi-continuous model, called tied mixture model, also uses two probabilities. The first one is the discrete probability associated with the codeword attributed to each vector in the vector quantization process, as previously described above. The probability of observing codeword k when the transition from state i to state j is taken is denoted by $b_{ij}(k)$. The second is a set of probability distributions $c_k^R(y_t)$, attributed to the codeword k. C is a continuous distribution function of the input vector $y_t$, and R denotes parameters of that distribution function (for example, C is Gaussian distribution and R consists of the mean and the standard deviation). If there are K distributions that are shared by all the models, then the probability of observing the frame vector $y_t$ on transition from model state i to state j is given by:

$$P_r(y_t/i,j) = \sum_{k=1}^{K} b_{ij}(k) \times c_k^R(y_t)$$

The training stage has to find both the $b_{ij}$ and the R parameters. The formulas are used in an iterative procedure (within the same framework as the discrete HMM) that estimates the optimal parameter values.

Sub-recognizers 30 were trained on the TIMIT acoustic/phonetic database. This database uses 64 different phonetic models; however, to simplify the training the present recognizer is trained on only 48 phone models, shown in FIG. 5 and listed in Table I;

TABLE I

| Phone | Example | Folded | Phone | Example | Folded |
|---|---|---|---|---|---|
| iy | beat | | en | button | |
| ih | bit | | ng | sing | eng |
| eh | bet | | ch | church | |
| ae | bat | | jh | judge | |
| ix | roses | | dh | they | |
| ax | the | | b | bob | |
| ah | butt | | d | dad | |
| uw | boot | ux | dx | (butter) | |
| uh | book | | g | gag | |
| ao | about | | p | pop | |
| aa | cot | | t | tot | |

TABLE I-continued

| Phone | Example | Folded | Phone | Example | Folded |
|---|---|---|---|---|---|
| ey | bait | | k | kick | |
| ay | bite | | z | zoo | |
| oy | boy | | zh | measure | |
| aw | bouth | | v | very | |
| ow | boat | | f | fief | |
| l | led | | th | thief | |
| el | bottle | | s | sis | |
| r | red | | sh | shoe | |
| y | yet | | hh | hay | hv |
| w | wet | | cl(sil) | (unvoiced closure) | pcl, tcl, kcl, qcl |
| er | bird | axr | vcl(sil) | (voiced closure) | bcl, dcl, gcl |
| m | mom | em | epi(sil) | (epinthetic closure) | |
| n | non | nx | sii | (silence) | h#, #h, pau |

(Reproduced from Kai-Fu Lee et al., "Speaker-Independent Phone Recognition sing Hidden Markov Models", *IEEE Transactions on Acoustics, Speech, and Signal Processing*, Vol. 37, No. 11, November 1989, pp. 1641–1648).

Figure 5:
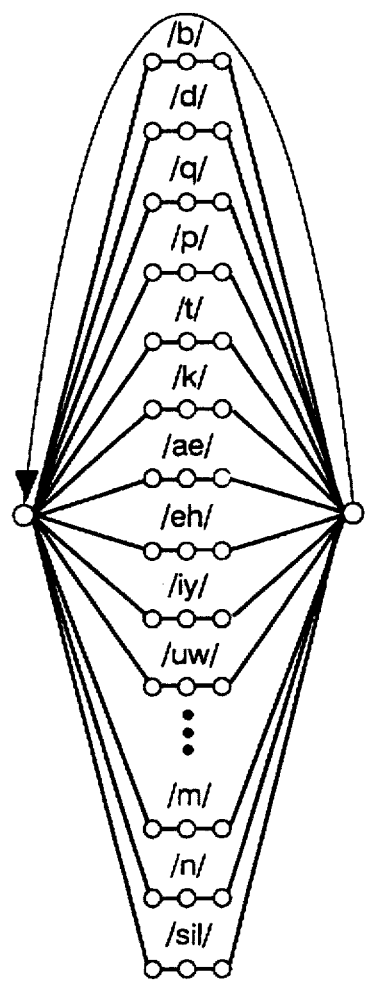
FIG. 5 is a diagram of phone models used in context-independent recognition.

Referring to FIGS. 6a, 6b, 7a, and 7b, in the topology of the linear left-to-right model, the model starts in an initial state 200 and ends with an exit arc 208 which is a special end-of-data arc. The arcs represent individual transitions. The transitions to the same state $a_{ii}$ are illustrated with curved arcs, and transitions to the next state $a_{ij}$ (i<j) are illustrated with horizontal arcs. The numbers associated with the arcs are the evaluated probabilities of the individual transitions. For example, the phonetic left-to-right model /aa/, FIGS. 6a and 6b, has three lattice points 202, 204, 206, corresponding to the beginning, middle, and end of a phone. In the training phase, estimation of the parameters of each model is performed using a set of selected training data with a known phonetic transcription. In the recognition phase, the parameter vectors are calculated for each frame and frequency band separately, and the identification of the unknown observation sequence is performed using the most likely class which would produce the observation sequence. This is done by evaluating the likelihood that each model would produce the observation sequence and identifying the models most likely to produce the sequence. As shown in FIG. 5, all initial states of all phonetic HMMs are connected together and have null arcs; similarly, all final states are connected together and have null arcs.

In some embodiments, the recognizer uses context-independent models of phones. In other embodiments, however, larger, context-dependent models of diphones or triphones may also be used. The latter models better describe the variety of coarticulatory influences. However, this approach leads to a large number of models, which are more difficult to train and more computationally intensive.

Figure 6A:
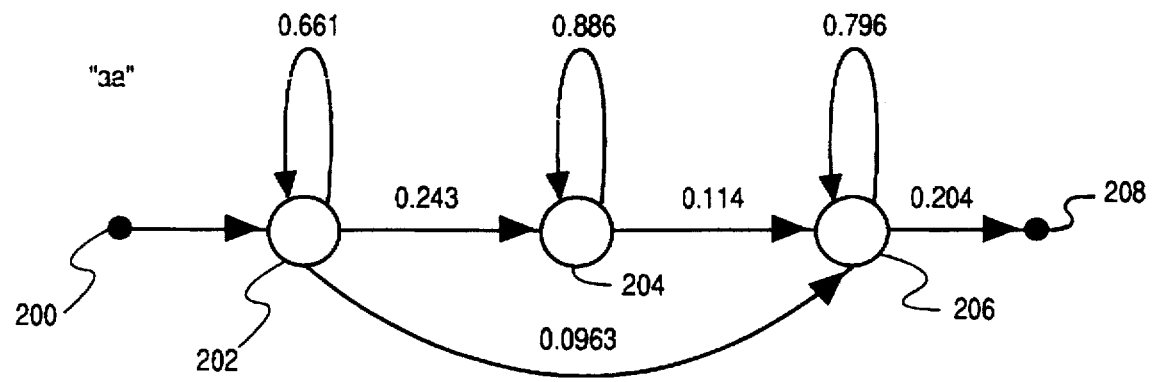
FIGS. 6a, 6b are diagrammatic models of a phone /aa/.
Figure 6B:
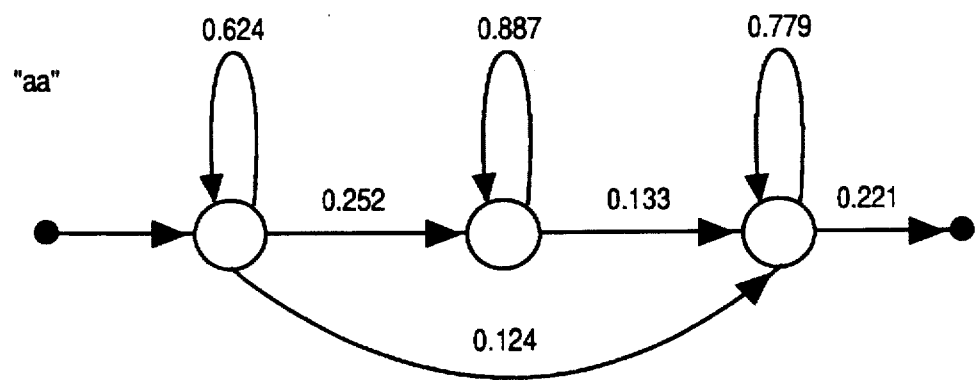
Figure 7B:
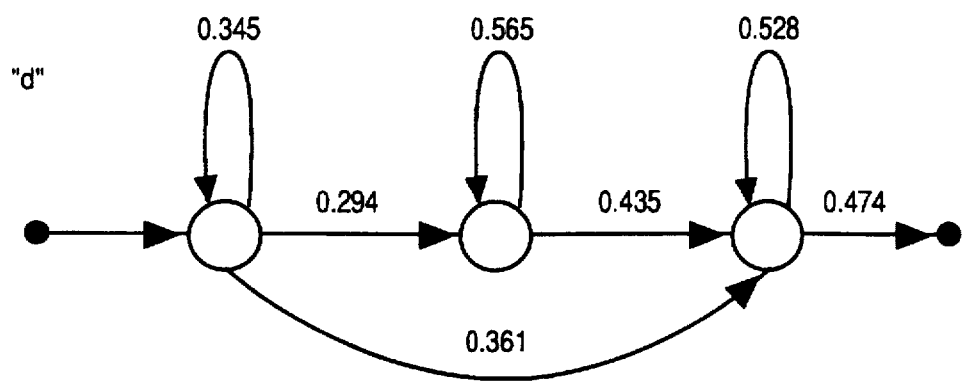
FIGS. 7a, 7b are diagrammatic models of a phone /d/.
Figure 7A:
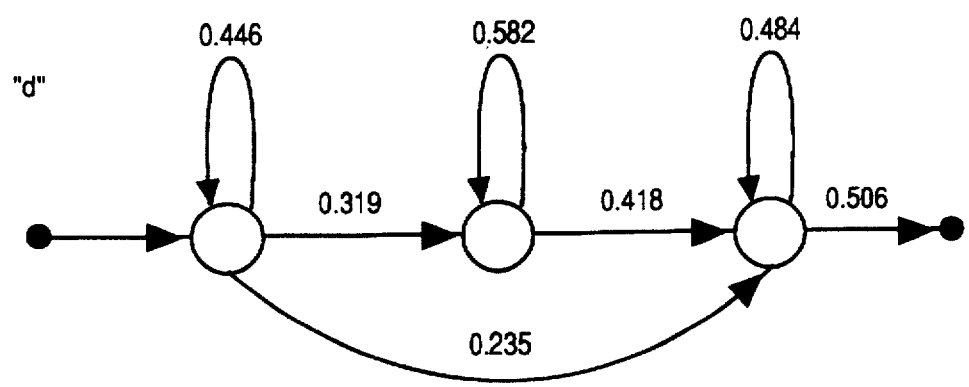

FIGS. 6a and 6b show the models of the phone /aa/ with the transition probabilities calculated in the first and second sub-recognizers, respectively. Similarly, FIGS. 7a and 7b show the models of the phone /d/ in the first two sub-recognizers. As expected, the transition probabilities in the vowel model strongly favor remaining in a given state whereas probabilities in the consonant model allow for easier transition to the next state. This reflects the fact that the vowel usually lasts longer than the consonant.

In the recognition process (28), each of the four sub-recognizers generates decisions on each frame of data. Specifically, sub-recognizer 30 outputs a label of the phone recognized over a sequence of several frames. The task of global recognizer 40 is to combine individual decisions of the sub-recognizers and generate final decision 61.

Since each sub-recognizer output, called a tentative decision, can contain only discrete labels which tag a recognized phone from a known, finite alphabet, all possible combinations of sub-recognizer outputs can be completely enumerated. By assigning an index to each of these possible combinations (one index per frame), the system creates an observation stream for global recognizer 40. Global recognizer 40, trained separately on another training data set, attributes final decision 41 to each index.

We consider K sub-recognizers matching each data frame at their outputs to one of M phones. The total number of possible combinations of the sub-recognizer outputs (labels of the recognized phones) in any given frame is $M^K$. We create the following global observation indexes of the global classifier. Each of the phones in the alphabet is given a label, i.e. an integer from 0 to M−1. Thus, the output of any sub-recognizer at time T, $r_k(T)$, is an integer from 0 to M−1. Then, the global observation index is given by:

$$g(T) = \sum_{k=1}^{K} r_k(T) \times M^{k-1}$$

For instance, suppose four sub-recognizers (K=4) recognize an alphabet of four phones (M=4). There would be 256($4^4$) possible combinations of sub-recognizer outputs and consequently 256 possible observations at the input to global classifier 40. According to the above formula, if the outputs of the four sub-recognizers (at time T) were the following four labels: $r_1=1, r_2=3, r_3=1,$ and $r_4=2$, the global observation index would be 157 (i.e. $1\times4^0+3\times4^1+1\times r^2+2\times r^3=157$). Each global observation index will have one assigned phone according to a decision integration process established in training of the global recognizer. The global recognizer takes the form of an HMM classifier which comprises the same number of phone models as the sub-recognizers. The topology of the phone models of the global recognizer, however, can differ from the three state left-to-right topology of the sub-recognizer phone model. The difference can be either in the number of states or in the interconnection topology between the states. The training and recognition procedures of the global recognizer are the same as the ones used for the models of the sub-recognizers. The input data of the global classifier is the above-described stream of the global observation indexes.

In another embodiment, the decision integration process which generates final decision 41 uses a maximum probability method. In the integration process, phone estimates of each sub-recognizer are aligned frame-by-frame to provide a sequence of phone estimate vectors $\{V_1, V_2, \ldots\}$ where each $V_t$ consists of the labels of the phone estimates produced by each of the K channels, i.e. $V_t=(P_{t1}, P_{t2}, \ldots P_{tK})$. There is one vector $V_t$ for each frame. Using the training data, estimates of the relative frequency of observing each possible phone estimate vector $(P_1, P_2, \ldots, P_K)$, assembled from the tentative decisions of K channels, are made for each spoken phone $Q_j$. In addition, the relative frequency of phone occurrence in the training corpus is estimated. Let $F_j(P_1, P_2, \ldots, P_K)$ denote the relative frequency of observing the phone estimate vector $(P_1, P_2, \ldots, P_K)$ when phone $Q_j$ is spoken and $f_j$ denote the relative frequency of the phone $Q_j$. Then, the output of the combined recognizer is the identity of the phone $Q_j$ that maximizes the product $f_j \times F_j(P_1, P_2, \ldots, P_K)$. Estimates of the numerical values of the set of $f_j$ may be obtained from a modest training corpus; they are likely to be a relative invariant property of the speaker's language and dialect. Estimates of the numerical values of the set of $F_j(P_1, P_2, \ldots, P_K)$ are specific to the sub-recognizers and generally require a substantially larger training corpus. As needed, approximate estimates may be used, for example, $F_j(P_1, P_2, \ldots, P_K)=F_{1j}(P_1)\times F_{2j}(P_2)\times \ldots \times F_{Kj}(P_K)$, where $F_{nj}(P_n)$ is the relative frequency that the phone estimate produced by the n-th channel recognizer is $P_n$ when the spoken phone is $Q_j$.

Referring to Table II:

TABLE II

|  | Phone-1 | Phone-2 | Phone-3 | Phone-4 |
|---|---|---|---|---|
| Subrecognizer 1 Assignment Frequencies | | | | |
| Spoken Phone | Recognized Phone | | | |
| Phone-1 | 60 | 20 | 15 | 5 |
| Phone-2 | 12 | 50 | 24 | 14 |
| Phone-3 | 7 | 17 | 44 | 32 |
| Phone-4 | 3 | 15 | 23 | 59 |
| Subrecognizer 2 Assignment Frequencies | | | | |
| Spoken Phone | Recognized Phone | | | |
| Phone-1 | 42 | 31 | 18 | 9 |
| Phone-2 | 13 | 53 | 30 | 4 |
| Phone-3 | 8 | 11 | 48 | 33 |
| Phone-4 | 6 | 12 | 37 | 45 |

| Combined Recognizer Mapping | | | | |
|---|---|---|---|---|
| Subrecognizer 1 | | Subrecognizer 2 | | |
| Phone-1 | Phone-1 | Phone-1 | Phone-1 | Phone-1 |
| Phone-2 | Phone-1 | Phone-2 | Phone-2 | Phone-4 |
| Phone-3 | Phone-1 | Phone-2 | Phone-3 | Phone-3 |
| Phone-3 | Phone-4 | Phone-2 | Phone-4 | Phone-4 | one example of the decision integration of global recognizer 40 is shown for the case of K=2 channels and 4 distinct phones assuming that each phone is spoken equally often i.e., equal relative frequency of occurance (the most difficult case). Relative frequencies of phone estimates for channel 1 are shown in the first table. The accuracy of the sub-recognizer of channel 1 is 53.25%. The relative frequencies of phone estimates for channel 2 are shown in the second table. Here, the accuracy of the sub-recognizer of channel 2 is 47.0%. The third table illustrates a decision integration rule based on the maximum probability. In this case wherein $F_j(P_1,P_2)=F_{1j}(P_1)\times F_{2j}(P_2)$, the combined global recognizer recognition accuracy is 57.663% which is greater than the accuracy of either sub-recognizer alone.

Table III

TABLE III

|  | Phone-1 | Phone-2 | Phone-3 | Phone-4 |
|---|---|---|---|---|
| Subrecognizer 1 Assignment Frequencies | | | | |
| Spoken Phone | Recognized Phone | | | |
| Phone-1 | 60 | 20 | 15 | 5 |
| Phone-2 | 12 | 50 | 24 | 14 |
| Phone-3 | 7 | 17 | 44 | 32 |
| Phone-4 | 3 | 15 | 23 | 59 |

TABLE III-continued

|  | Phone-1 | Phone-2 | Phone-3 | Phone-4 |
|---|---|---|---|---|
| Subrecognizer 2 Assignment Frequencies | | | | |
| Spoken Phone | | Recognized Phone | | |
| Phone-1 | 42 | 31 | 18 | 9 |
| Phone-2 | 13 | 53 | 30 | 4 |
| Phone-3 | 8 | 11 | 48 | 33 |
| Phone-4 | 6 | 12 | 37 | 45 |
| Combined Recognizer Mapping | | | | |
| Subrecognizer 1 | | Subrecognizer 2 | | |
| Phone-1 | Phone-1 | Phone-2 | Phone-2 | Phone-3 |
| Phone-2 | Phone-2 | Phone-2 | Phone-2 | Phone-3 |
| Phone-3 | Phone-3 | Phone-2 | Phone-3 | Phone-3 |
| Phone-4 | Phone-3 | Phone-2 | Phone-3 | Phone-3 | shows an example of the decision integration of global recognizer 40 wherein the rates of occurrence of phone-2 and phone-3 are four times as great as the rates of occurrence of phone-1 and phone-4. Relative frequencies of phone estimates for channel 1 are shown in the first table. To calculate the accuracy of the sub-recognizer of channel 1, one has to multiply the relative estimates of each phone by the rates of occurrence of that phone. Thus, in this case the accuracy of channel 1 drops to 49.5% from the 53.25% of the previous case of equal phone frequency. The accuracy of the sub-recognizer of channel 2 is calculated in the same way; it is 49.1%. The global recognizer accuracy is 64% which is again greater than the accuracy of either sub-recognizer alone.

Figure 8:
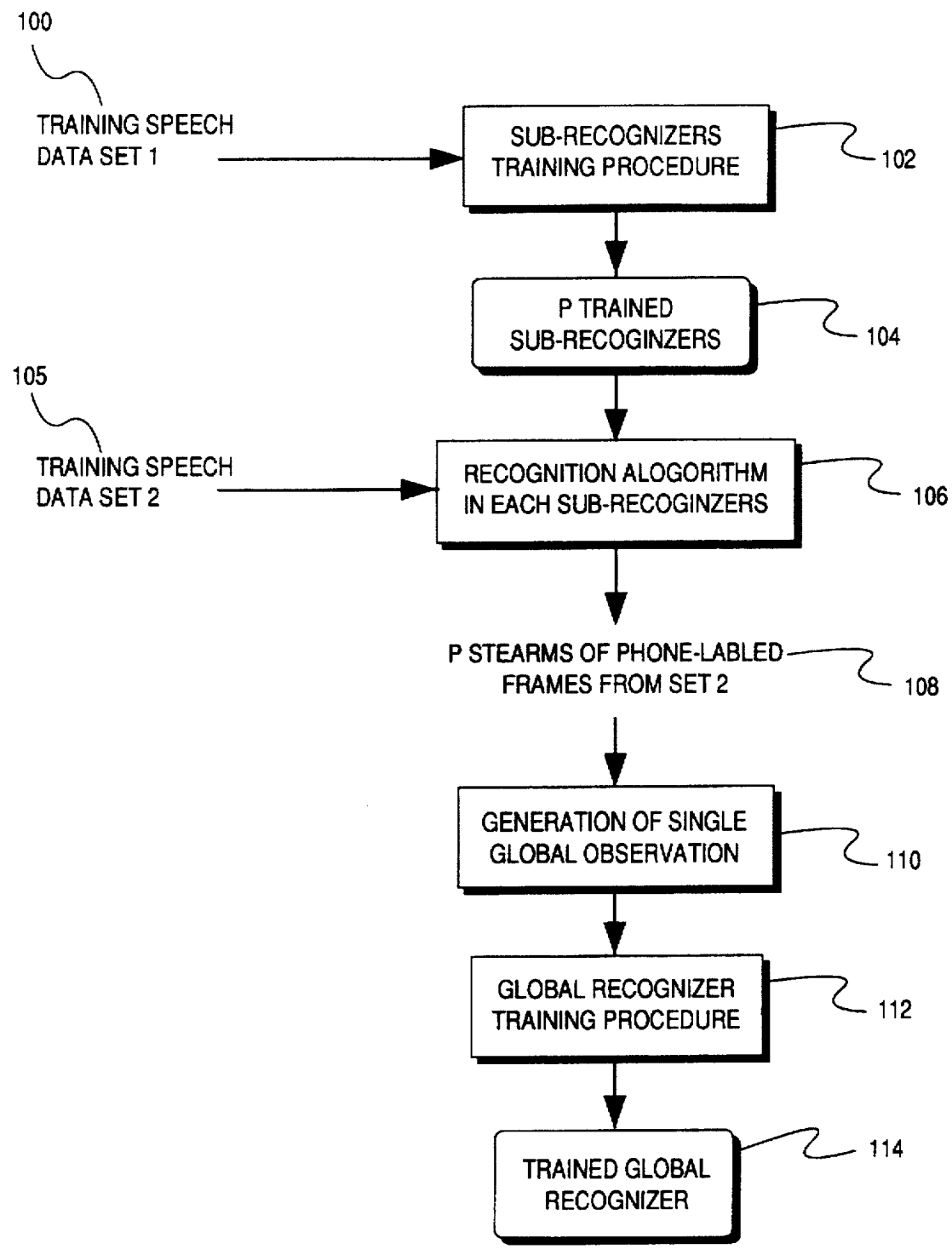
FIG. 8 is a schematic diagram of the speech recognizer's training procedure.

Overall order of procedures needed to train the global recognizer is schematically shown in FIG. 8. A training speech data set 1 (100) is used to train all sub-recognizers (102). After the sub-recognizers are trained (104), a training speech data set 2 is analyzed using the recognition algorithm of each sub-recognizer (106) and a stream of phone labels of each time-based data frame is sent to the global recognizer (108). The global recognizer in either embodiment is trained on this second set of the training speech data, as described above. After the classifier training procedure of the global recognizer is completed (114), the recognizer is trained and ready for operation.

Other embodiments of the invention are within the scope of the claims. For example, the filters of the automatic speech recognizer can span a different frequency range, e.g., up to 8 kHz and may include a different number of filters. The number of filters then determines the number of the processing channels which again are essentially independent of each other. The types of parameters used for training and recognition in the sub-bands can also both be different from each other because the acoustic signals carry different portions of the perceptually relevant information. Some sub-bands can use time domain based vector parameters as described above, and other sub-bands can use vector parameters based on the Fourier spectrum, or based on the linear prediction spectrum. Different decision integration schemes are also possible. Furthermore, application requirements will affect the number of processing channels, the choice of the vector parameters, and the model schemes since they all dictate the computational needs, hence, the physical size and the cost of the speech recognizer.

Generation of the Vector Quantizer Codebook

The following steps describe generation of a codebook of M vectors using N training vectors:

Step 1—Initialization:
Find first centroid:

$$c_1 = 1/N \sum_{n=1}^{N} v_n$$

Set number of centroids: K=1
Assign all vectors to set 1.
Step 2—for k between 1 and 2K generate markers r:

$$r_k = \begin{cases} \frac{c_k}{2}(1+\epsilon) \text{ for } k \text{ even} \\ \frac{c_{k+1}}{2}(1-\epsilon) \text{ for } k \text{ odd} \end{cases}$$

where $\epsilon$ is a constant $<<1$.
Set K to double its old value.
Step 3—Assign vectors to sets:
For all n between 1 and N compute $$k_{min}(n) = \underset{1 \leq k \leq K}{\text{argmin}} \; (\|v_n - r_k\|)$$

and assign vector $v_n$ to set $k_{min}(n)$.
Step 4—Compute average distance of vectors to markers:

$$D_A = 1/N \sum_{k=1}^{K} \sum_{\substack{n \, s.t. \\ v_n \in set \, k}} \|v_n - r_k\|$$

Step 5—Find centroids of all sets:
For all k between 1 and K:

$$c_k = \frac{1}{\# \text{ of vec. in set } k} \sum_{\substack{n \, s.t. \\ v_n \in set \, k}} v_n$$

Step 6—Compute average distance to centroids:

$$D_B = 1/N \sum_{k=1}^{K} \sum_{\substack{n \, e.t. \\ v_n \in set \, k}} \|v_n - c_k\|$$

Step 7—Check convergence, where $\delta$ is a preset convergence constant:

$$\text{If} \; \frac{|D_A - D_B|}{|D_A|} > \delta$$

then for all k between 1 and K set $r_k = c_k$ and go to step 3; otherwise continue.
Step 8—If K=M stop:
codebook consists of the vectors $c_k$ for $1 \leq k \leq M$; otherwise go to step 2.

What is claimed is:

1. A method for making a decision on a speech element in a signal representing an utterance, from among a set of possible speech elements, comprising generating one representation of said utterance based on one range of acoustic frequencies, generating at least one separate representation of said utterance based on a different range of acoustic frequencies, deriving one tentative decision on said speech element from the one representation based on the one range of acoustic frequencies, said one tentative decision being at least one of said speech elements, deriving at least one separate tentative decision on said speech element from the at least one separate acoustic representation based on the different range of acoustic frequencies, said at least one separate tentative decision being at least one of said speech elements, and generating a final decision on said speech element from said one tentative decision and said at least one separate tentative decision, said final decision being one of said speech elements.

2. The method of claim 1 further comprising forming each of said one acoustic representation and said at least one separate acoustic representation based on a band of acoustic frequencies.

3. The method of claim 2 wherein said one acoustic representation and said at least one separate acoustic representation are divided into time-based frames.

4. The method of claim 3 wherein said time-based frames are 20 millisecond long.

5. The method of claim 2 wherein different said bands of said acoustic frequencies are non-overlapping.

6. The method of claim 2 wherein there are at least four said bands.

7. The method of claim 1 wherein said steps of deriving one tentative decision and deriving at least one separate tentative decision includes forming a parameter vector for each of said one acoustic representation and said at least one separate acoustic representation, quantizing said parameter vector to form a quantized vector, and mapping each said quantized vector to one of said tentative decisions.

8. The method of claim 7 wherein said parameter vector has at least one parameter which characterizes said representation in time domain.

9. The method of claim 8 wherein said parameter is created using an autocorrelation function.

10. The method of claim 7 wherein said mapping comprises applying a sub-recognizer to match each said quantized vector to a model of said speech element.

11. The method of claim 1 or 10 adapted for use in recognizing speech elements in utterances which appear in continuous speech, further comprising dividing said continuous speech into successive time-based frames, and applying said method to each of said frames.

12. The method of claim 10 wherein said subrecognizer issues one of said tentative decisions on said speech element per said time-based frame.

13. The method of claim 1 or 12 wherein said speech element comprises a phone.

14. The method of claim 1 wherein said final decision is generated by maximizing a product of a relative speech element occurrence frequency and a relative frequency of observing a phone estimate vector, wherein said relative frequency of observing the phone estimate vector is determined from said tentative decisions.

15. The method of claim 1 wherein said step of generating said final decision includes forming a global observation index based on said tentative decisions derived from said individual acoustic representations, and mapping a global observation index to said final decision.

16. The method of claim 15 wherein said mapping comprises applying a global recognizer to match said global observation index to a model of said speech element.

17. The method of claim 10 or 16 wherein said model comprises a left-to-right hidden Markov model.

18. An apparatus for making a decision on a speech element in a signal representing an utterance, from among a set of possible speech elements, comprising a filter for isolating one acoustic representation of said utterance based on one range of acoustic frequencies, at least one additional filter for isolating a separate acoustic representation of said utterance based on a different range of acoustic frequencies, processing channels for deriving one tentative decision on said speech element from said one representation based on the one range of acoustic frequencies, said one tentative decision being at least one of said speech elements, and for deriving at least one separate tentative decision on said speech element from said separate acoustic representation based on the different range of acoustic frequencies, said at least one separate tentative decision being at least one of said speech elements, and a global recognizer connected to and receiving from said processing channels said one tentative decision and said at least one separate tentative decision on said speech element to generate a final decision on said speech element, said final decision being one of said speech elements.

19. The apparatus of claim 18 wherein said filters isolate acoustic representations of non-overlapping acoustic frequencies.

20. The apparatus of claim 18 wherein there are at least four filters.

21. The apparatus of claim 18 wherein said processing channel comprises a parameter extractor for generating a parameter vector for each said acoustic representation, vector quantizer for quantizing said parameter vector to form a quantized vector, and a sub-recognizer for mapping each said quantized vector to one of said tentative decisions.

22. The apparatus of claim 21 wherein said acoustic representations are divided into time-based frames.

23. The apparatus of claim 22 wherein said time-based frames of speech are 20 millisecond long.

24. The apparatus of claim 23 wherein said sub-recognizer issues one of said tentative decisions on said speech element per said time-based frame.

25. The apparatus of claim 21 wherein said mapping comprises matching each of said quantized vectors to a model of said speech element.

26. The apparatus of claim 25 wherein said parameter is created using autocorrelation function.

27. The apparatus of claim 21 wherein said parameter vector has at least one parameter which characterizes said acoustic representation in time domain.

28. The apparatus of claim 18 wherein said global recognizer generates said final decision by maximizing a product of a relative speech element occurrence frequency and a relative frequency of observing a phone estimate vector, said relative frequency of observing the phone estimate vector being determined from said tentative decisions.

29. The apparatus of claim 18 wherein said global recognizer is designed to form a global observation index based on said tentative decisions derived from said acoustic representations and to generate a final decision by mapping a global observation index to a model of said speech element.

30. The apparatus of claim 24 or 29 wherein said model comprises a left-to-right hidden Markov model.

31. The apparatus of claim 18, 28 or 29 wherein said speech element comprises a phone.

\* \* \* \* \*